United States Patent Office 3,222,310
Patented Dec. 7, 1965

3,222,310
METHOD FOR INHIBITING COLOR FORMATION IN AMINES
Alfred A. Hinckley, Beverly, Mass., assignor to Metal Hydrides Incorporated, Beverly, Mass., a corporation of Massachusetts
No Drawing. Filed Nov. 20, 1963, Ser. No. 325,151
6 Claims. (Cl. 260—29.6)

This invention relates to a method for inhibiting color formation in certain amines, such as aromatic and heterocyclic amines and solutions thereof.

It is well known that there is an undesirable color formation in many amines during storage. Thus, aniline changes color markedly upon standing for less than one day. Similarly, aqueous solutions of polyvinyl pyrrolidone change color markedly upon standing for less than three days. When these amines are used as reducing agents the undesirable color appears in the reduction product.

The present invention is based upon the discovery that when a small amount of an alkali metal borohydride, such as sodium borohydride or potassium borohydride, is dissolved in an aromatic amine or a heterocyclic amine or aqueous solutions of water-soluble heterocyclic amines, color formation is inhibited for several days and in some instances for one year or more. Thus, when sodium borohydride was added to aniline no color formation was noted after standing for two days. When sodium borohydride was added to an aqueous solution of polyvinyl pyrrolidone no color formation was noted after standing for one year. The amount of alkali metal borohydride required will vary slightly with various amines but, in general, between about 10 and 150 parts per million by weight based upon the weight of the amine is sufficient. A larger amount of alkali metal borohydride may be used but, in general, is not necessary and is wasteful.

As illustrative of aromatic and heterocyclic amines and aqueous solutions of heterocyclic amines in which color formation may be inhibited I may mention aniline, o-toluidine, pyrrole, 2-pyrrolidone, aqueous solution of polyvinyl pyrrolidone, p-ethoxy aniline, quinoline, piperazine, and pyrazine amines.

The invention is illustrated further by the results shown in the following table. In the table the amount of borohydride used is indicated in parts per million by weight based upon the weight of the amine or solution thereof. The table indicates the color of each amine when no borohydride is dissolved therein both initially and after standing for the indicated number of days. It also indicates the color of the amine containing dissolved borohydride both initially and after standing for the indicated number of days. The color determinations were made by the Standard Method of Test for Color of Clear Liquids (Platinum-Cobalt Scale) ASTM Designation: D1209–62.

TABLE

| Amine | Amount of Borohydride | Initial Color | Color After Standing for the Number of Days Indicated | | | | | | |
|---|---|---|---|---|---|---|---|---|---|
| | | | 1 | 2 | 3 | 5 | 7 | 8 | 9 |
| 10% aqueous solution of polyvinyl pyrrolidone. | None | 75 | | | 150 | | | | 150 |
| Do | 128 | 75 | | | 75 | | | | 75 |
| Aniline | None | 50 | 200 | 500 | | | >500 | | |
| Do | 112 | 50 | 50 | 50 | | | 200 | | |
| Pyrrole | None | 15 | | | | 200 | 400 | | |
| Do | 136 | 15 | | | | 75 | 75 | | |
| o-Toluidine | None | 50 | | 100 | | | | 100 | |
| Do | 124 | 50 | | 50 | | | | 50 | |
| 2-pyrrolidone | None | 50 | | | | | | | ¹ 200 |
| Do | 111 | 50 | | | | | | | 50 |

¹ 1 year.

Similar results were obtained with potassium borohydride.

I claim:
1. The method for inhibiting color formation in an amine selected from the group consisting of aniline, o-toluidine, pyrrole, and 2-pyrrolidone, and an aqueous solution of an amine selected from the group consisting of polyvinyl pyrrolidone, p-ethoxy aniline, quinoline, piperazine, and pyrazine amines which comprises dissolving therein a borohydride selected from the group consisting of sodium borohydride and potassium borohydride in an amount between about 10 and 150 parts per million by weight based upon the weight of the amine.
2. The method as claimed by claim 1 wherein the amine is aniline.
3. The method as claimed by claim 1 wherein the amine is an aqueous solution of polyvinyl pyrrolidone.
4. The method as claimed by claim 1 wherein the amine is pyrrole.
5. The method as claimed by claim 1 wherein the amine is o-toluidine.
6. The method as claimed by claim 1 wherein the amine is 2-pyrrolidone.

References Cited by the Examiner

Gaylord, Reduction With Complex Metal Hydrides, Interscience Publishers, Inc., New York, 1956, pages 17–19 and 730.

Schechter et al., "Boron Hydrides and Related Compounds," prepared under contract NOa (s) 10992 for Dept. of Navy, Bureau of Aeronautics, prepared by Callery Chemical Co., printed March 1951, declassified December 1953, page 45.

NICHOLAS S. RIZZO, *Primary Examiner.*

IRVING MARCUS, *Examiner.*